US010119437B2

(12) United States Patent
Buchen et al.

(10) Patent No.: US 10,119,437 B2
(45) Date of Patent: Nov. 6, 2018

(54) RECEPTACLE FOR A FLUID, IN PARTICULAR ENGINE OIL PAN OR TRANSMISSION OIL PAN FOR A MOTOR VEHICLE

(75) Inventors: Marc Buchen, Morsbach (DE); Wolfgang Stausberg, Morsbach (DE); Jörg Kluser, Friesenhagen (DE)

(73) Assignee: IBS Filtran Kunststoff-/Metallerzeugnisse GmbH, Morsbach (DE)

( * ) Notice: Subject to any disclaimer, the term of this patent is extended or adjusted under 35 U.S.C. 154(b) by 575 days.

(21) Appl. No.: 13/080,137

(22) Filed: Apr. 5, 2011

(65) Prior Publication Data
US 2012/0091139 A1 Apr. 19, 2012

(30) Foreign Application Priority Data
Oct. 19, 2010 (DE) .......................... 10 2010 048 711

(51) Int. Cl.
| B65D 41/06 | (2006.01) |
| B65D 41/36 | (2006.01) |
| B65D 1/34 | (2006.01) |
| B65D 39/10 | (2006.01) |
| F16N 31/00 | (2006.01) |
| F01M 11/04 | (2006.01) |
| F16H 57/04 | (2010.01) |

(52) U.S. Cl.
CPC ..... F01M 11/0408 (2013.01); F16H 57/0408 (2013.01); F01M 2011/0416 (2013.01)

(58) Field of Classification Search
CPC .............. B65D 39/10; F01M 11/0408; F01M 2011/0416; F16H 57/0452; F16H 57/0408
USPC .................................. 220/293, 573; 184/106
See application file for complete search history.

(56) References Cited

U.S. PATENT DOCUMENTS 4,717,119 A * 1/1988 Trin ..................... F01P 11/0276
220/300
5,259,185 A * 11/1993 Peterson ................. F02C 7/222
285/14

(Continued)

FOREIGN PATENT DOCUMENTS

DE 3817981 C1 12/1988
DE 69811401 T2 11/2003

(Continued)

OTHER PUBLICATIONS

Office Action for Japanese Patent Application No. 2011-093919 dated Nov. 4, 2014; 2 pages.

(Continued)

Primary Examiner — Andrew T Kirsch
(74) Attorney, Agent, or Firm — Grossman, Tucker, Perreault & Pfleger, PLLC

(57) ABSTRACT

The disclosure provides a receptacle for a fluid, in particular an engine oil pan or transmission oil pan for a motor vehicle, comprising at least one, in the installed position, lower drain opening and at least one closing body which can be inserted in the drain opening, the drain opening and the closing body forming parts, configured to be complementary to one another, of a closure which seals the receptacle and the closure being in the form of a bayonet closure. The receptacle according to the disclosure is distinguished by the fact that the closing body is centered in the drain opening by a sealing means.

10 Claims, 8 Drawing Sheets

(56) References Cited

U.S. PATENT DOCUMENTS

| | | | | |
|---|---|---|---|---|
| 5,680,954 A | * | 10/1997 | Arnold et al. | ................ 220/300 |
| 2002/0074335 A1 | | 6/2002 | Ono et al. | |
| 2007/0170390 A1 | * | 7/2007 | Jessberger | ................... 251/215 |
| 2008/0000724 A1 | | 1/2008 | Stlaske et al. | |
| 2008/0135340 A1 | * | 6/2008 | Schlicker et al. | ............ 184/106 |

FOREIGN PATENT DOCUMENTS

| | | |
|---|---|---|
| DE | 202005004943 U1 | 7/2006 |
| DE | 202008009179 U1 | 4/2010 |
| DE | 102008057518 A1 | 5/2010 |
| DE | 102012220695 | 5/2014 |
| EP | 2990621 | 3/2016 |
| JP | 55-160144 | 12/1980 |
| JP | 2002-179120 | 6/2002 |

OTHER PUBLICATIONS

Chinese Office Action dated Aug. 24, 2015 in counterpart Chinese Patent Application No. 201110122859.6.

\* cited by examiner

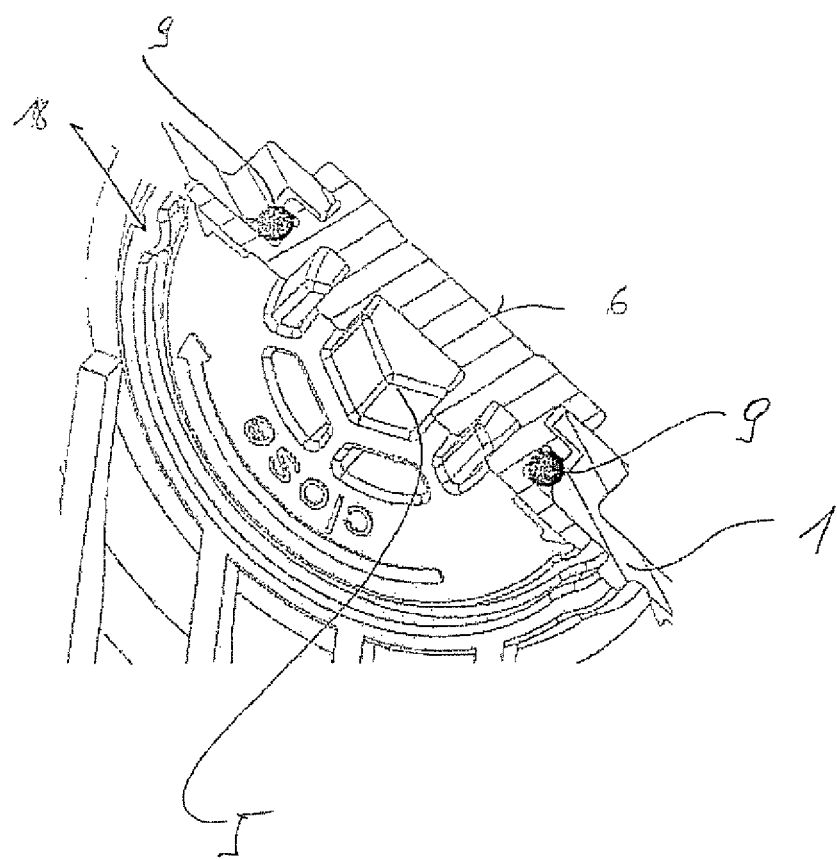

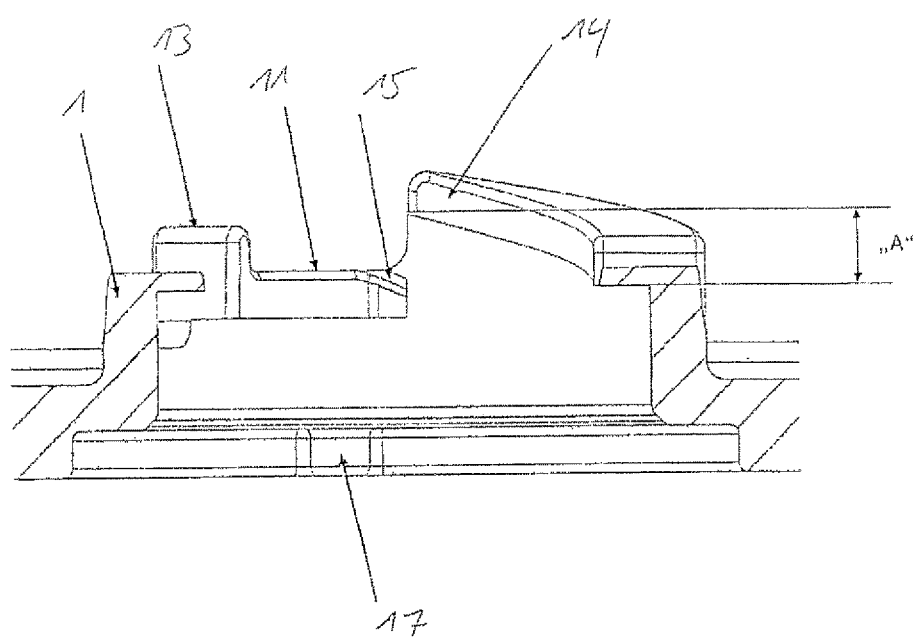

RECEPTACLE FOR A FLUID, IN PARTICULAR ENGINE OIL PAN OR TRANSMISSION OIL PAN FOR A MOTOR VEHICLE

PRIORITY

This application claims priority to German Patent Application No. DE 10 2010 048 711.2, filed Oct. 19, 2010, the disclosure of which is hereby incorporated by reference.

FIELD

The invention relates to a receptacle for a fluid, in particular an engine oil pan or a transmission oil pan for a motor vehicle, comprising at least one, in the installed position, lower drain opening and at least one closing body which can be inserted in the drain opening, the drain opening and the closing body forming parts, configured to be complementary to one another, of a closure which seals the receptacle, and the closure being in the form of a bayonet closure.

BACKGROUND

A receptacle of this type is known, for example, from DE 20 2008 009 179 U1 in the form of an oil pan arrangement of a motor vehicle. DE 20 2008 009 179 U1 describes, in particular, an engine oil pan of lightweight construction which may be made, for example, of diecast aluminum or plastics material. In this context polyimide, in particular, is described as a suitable material for producing a plastics oil pan. Especially in the case of plastics oil pans, the oil drain plugs may be secured with only comparatively low torques. For example, with transmission oil pans made of plastics material a torque in the region of approximately 8 Nm is prescribed in order to protect the thread. During maintenance work it can happen that the oil drain screw is not appropriately tightened. If a torque wrench is not used, the thread in the oil pan can be damaged or even stripped. In order to overcome this problem, DE 20 2008 009 179 U1 proposes a thread with a sliding guide which has rotation stops arranged on the outer side of the oil pan and configured in such a manner that the rotation stops enable the user to check visually whether the oil drain plug is in its prescribed, closed and sealing operating position. It is thereby ensured as far as possible that the thread, the sliding guide or, if applicable, the bayonet closure, is not overloaded.

Threads or sliding guides as described, for example, in DE 20 2008 009 179 U1 are comparatively difficult to implement in a manner appropriate to plastics materials in particular. If the corresponding components, such as the oil pan and the oil drain plug, are to be produced by the injection molding process, the tooling necessary for this purpose is comparatively complex and costly, since a rotating core for forming the thread must be provided.

Especially in the case of a multiple mold, as is generally used, this entails a high cost.

Apart from the fact that, because of the need to respect the low tightening moments, the process of inserting the oil drain screw as described in DE 20 2008 009 179 U1 can only be made secure or carried out using special means, fluid-tightness is comparatively difficult to ensure with systems comprising closing plugs made of plastics material with threads made of plastics material or with sliding guides made of plastics material. This is bound up with the fact that, in particular, the pretensioning of the closing plug necessary for the fluid-tightness of the system can be lost through changes of shape of the material due to temperature fluctuations.

SUMMARY

It is therefore the object of the invention to improve a receptacle of the type mentioned in the introduction in the abovementioned respects.

This object is achieved by a receptacle for a fluid, in particular by an engine oil pan or transmission oil pan for a motor vehicle, comprising at least one lower, in the installed position, drain opening and at least one closing body which can be inserted in the drain opening, the drain opening and the closing body forming parts, configured to be complementary to one another, of a closure which seals the receptacle, the closure being in the form of a bayonet closure and the receptacle being distinguished by the fact that the closing body is centered in the drain opening by a sealing means.

In contrast to known closure systems according to the prior art, it is provided according to the invention that the sealing function is decoupled entirely from the closing function. In other words, the fluid-tightness of the system is ensured independently of the pretensioning forces required for locking.

According to the invention, the closing body is mounted in the drain opening in a floating manner, so that changes of shape of the material due to temperature fluctuations can be compensated in this way.

Advantageously, the clear width of the drain opening is larger than the diameter of the part of the closing body which passes through the drain opening, the overdimensioning of the drain opening being selected such that the closing body can be inserted in the drain opening with radial play.

The receptacle according to the invention is preferably in the form of an engine oil pan or a transmission oil pan and consists preferably of thermoplastic material. For example, polyamide may be considered as a material both for the receptacle itself and for the closing body.

Because the closure is in the form of a bayonet closure, all the parts of the closure which must be brought into engagement with one another can be configured without undercuts, so that manufacture by injection molding is possible using the simplest tooling.

In an especially preferred variant of the receptacle according to the invention, it is provided that the closure has, arranged on the inner side thereof, at least one rotation stop which defines an end position of the closing body in the closed state.

The rotation stop or stops is/are preferably configured in such a manner that a further rotation of the closing body into the drain opening is not possible. That is to say that the rotation stop is configured as a perceptible end stop which makes visual checking of the depth of insertion of the closing body unnecessary.

The closing body is expediently configured in such a manner that, in the completely inserted state, it lies flush with the outer contour of the receptacle.

Locking of the closing body in the end position in the closed state is usefully provided.

In a preferred variant of the receptacle according to the invention it may be provided that, in order to lock the closing body in an end position, at least one latching projection and/or latching recess is provided on the periphery thereof and cooperates with at least one latching recess and/or latching projection on the periphery of the drain opening.

Especially because the closing body is mounted within the drain opening in a floating manner, that is with radial play, a radial yielding movement of the closing body is possible as it is twisted to the locked end position when latching recesses and/or latching projections on the periphery of the locking body and on the periphery of the drain opening come into engagement with one another.

The drain opening is preferably provided on its periphery with retaining faces and/or guide faces which cooperate in a form-fitting manner with parts of the closing body.

The closing body may be guided within the drain opening over at least one arc segment of a rotary movement in such a manner that an applied torque is converted into an axial movement of the closing body.

In this case the closing body is usefully guided axially, over a first arc segment, on the circumference of the drain opening to the closed and preferably locked end position.

Equally, it may be provided that the closing body is guided axially, over a second arc segment, from the locked end position to an open position, the first and second arc segments occupying different angular ranges in relation to the circumference of the drain opening, so that both the outer contour of the closing body and the guide faces and retaining faces on the periphery of the drain opening can be implemented entirely without undercuts.

The second arc segment of the guide of the closing body preferably describes a lifting movement of the closing body which is at least as great as the strand thickness of a sealing ring provided on the closing body, so that opening of the closing body produces at least a lift (axial movement of the closing body) which pushes one or more sealing rings out of the drain opening, so that the closing body can be removed from the drain opening unimpeded in the axial direction.

In an expedient configuration of the receptacle according to the invention, it is provided that the closing body has at least two locking hooks or locking pegs which engage behind retaining faces on the periphery of the drain opening, at least in the closed end position of the closing body.

In interaction with the locking pegs, the retaining faces bring about only an axial locking of the closing body; the circumferential gripping is effected solely by means of one or more sealing means which center the closing body in the drain opening.

BRIEF DESCRIPTION OF THE DRAWINGS

The invention is explained below with reference to an exemplary embodiment represented in the drawings, in which:

FIG. 7 shows a partial section through the closed, locked closure along the lines VII-VII in FIG. 1, and FIG. 8 is a sectional view along the lines VIII-VIII in FIG. 1.

DETAILED DESCRIPTION

The receptacle according to the invention is exemplified as an oil pan 1 made of polyamide for a motor vehicle.

Figure 1:
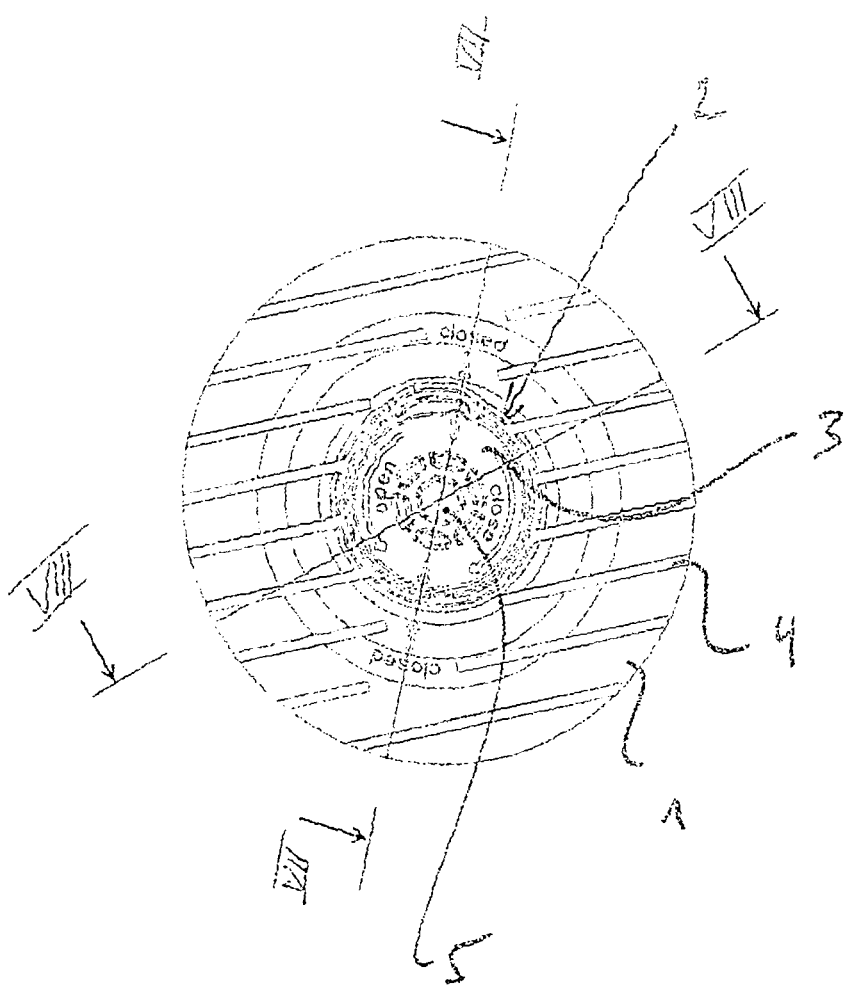
FIG. 1 is a view from below of the receptacle according to the invention.

FIG. 1 shows a detail of a view from below of an oil pan 1 according to the invention, with an oil drain plug 3 as the closing body inserted in a drain opening 2 of the oil pan 1.

Both the oil pan 1 and the oil drain plug 3 have been produced in one piece from thermoplastic material by injection molding. The oil pan 1 is provided with ribbing 4 on its outer side. A substantially circular drain opening 2, with which the oil drain plug 3, inserted sealingly therein, forms a bayonet closure to be described in more detail below, passes through the wall of the oil pan 1.

The oil drain plug 3 is provided on its outer/lower side with a tool engagement recess in the form of a hexagon socket 5.

Figure 2:
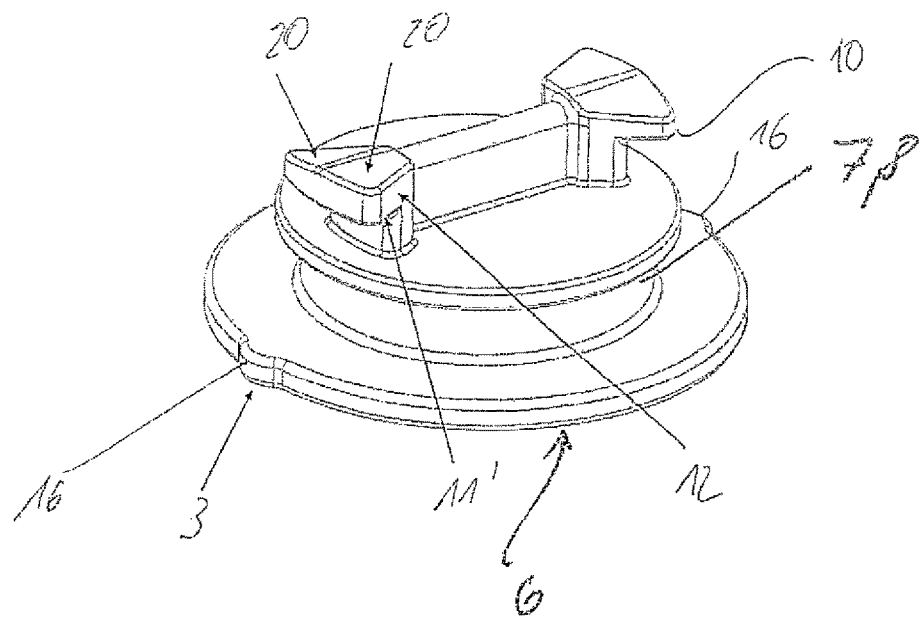
FIG. 2 is a perspective view of the closing body.
Figure 3:
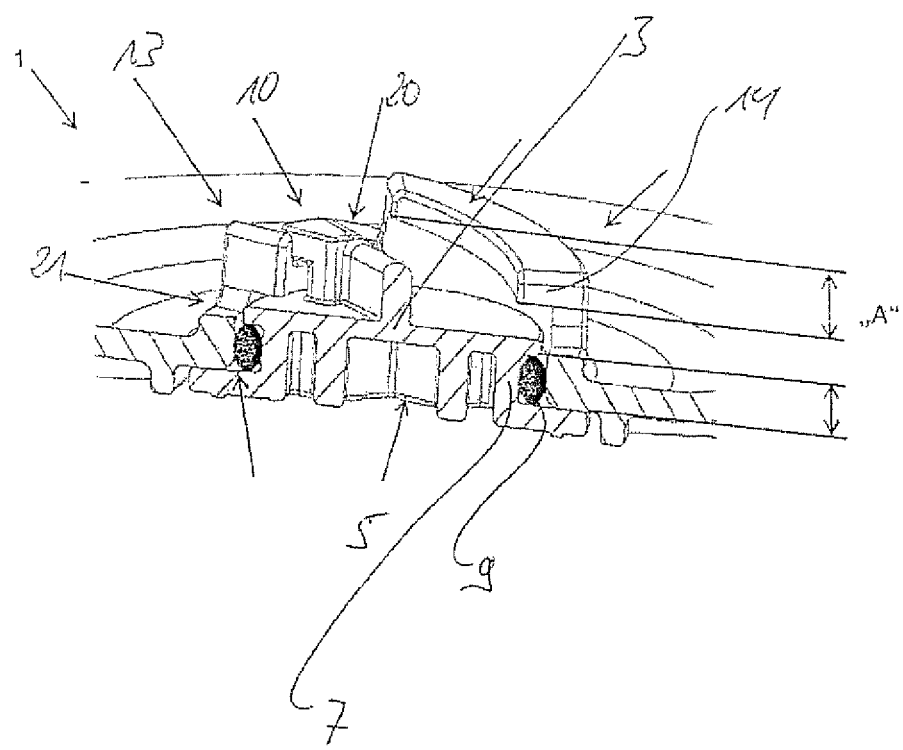
FIG. 3 shows a partial section through the closure in a perspective view.

FIG. 2 shows the oil drain plug 3 in a perspective representation, the lower/outer side of the oil drain plug 3 shown in FIG. 1 being oriented away from the viewer in FIG. 2.

The oil drain plug 3 comprises substantially a closing cover 6 with an integrally molded body 7 which passes through the drain opening 2 in the installed position. The body 7 of the closing cover 6 is provided with a circumferential groove 8 which serves to receive an O-ring seal 9.

Provided on the inner side of the body 7 of the oil drain plug 3 are two locking hooks 10 arranged diametrically opposite one another which, in the locked end position of the oil drain plug 3, engage behind retaining faces 11 of a collar which projects inwardly into the oil pan 1 and forms an inner surround of the drain opening 2. The retaining faces 11 each extend over only a part of the angular extent of the drain opening 2 at respective diametrically opposite locations of the drain opening 2.

Figure 4:
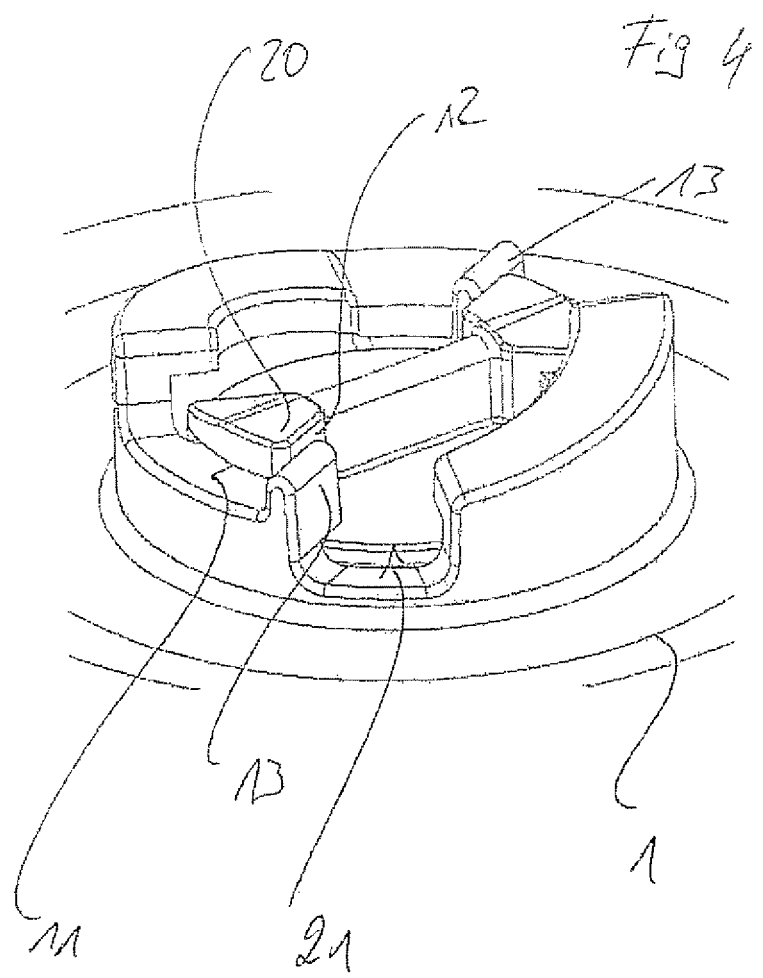
FIG. 4 is a perspective view of the inner side of the receptacle in the region of the closure, in the locked position.

In the locked and closed position of the oil drain plug 3 represented in FIG. 4, stops 12 of the locking hooks 10 of the oil drain plug 3, which stops 12 lead in the direction of rotation, abut against rotation limiting stops 13 on the periphery of the drain opening 2.

In the following exposition reference will be made to FIG. 8. The configuration of the periphery of the drain opening 2 over an angular extent of approximately 180° can be seen in the view shown in that figure. Reference 14 denotes an oblique guide extending approximately over an arc of 90°, which is adjoined by a guide ramp 15 which extends from right to left in the drawing (FIG. 8) and merges into the retaining face 11 which extends approximately in a plane and at the end of which a rotation limiting stop 13 is located.

Figure 5:
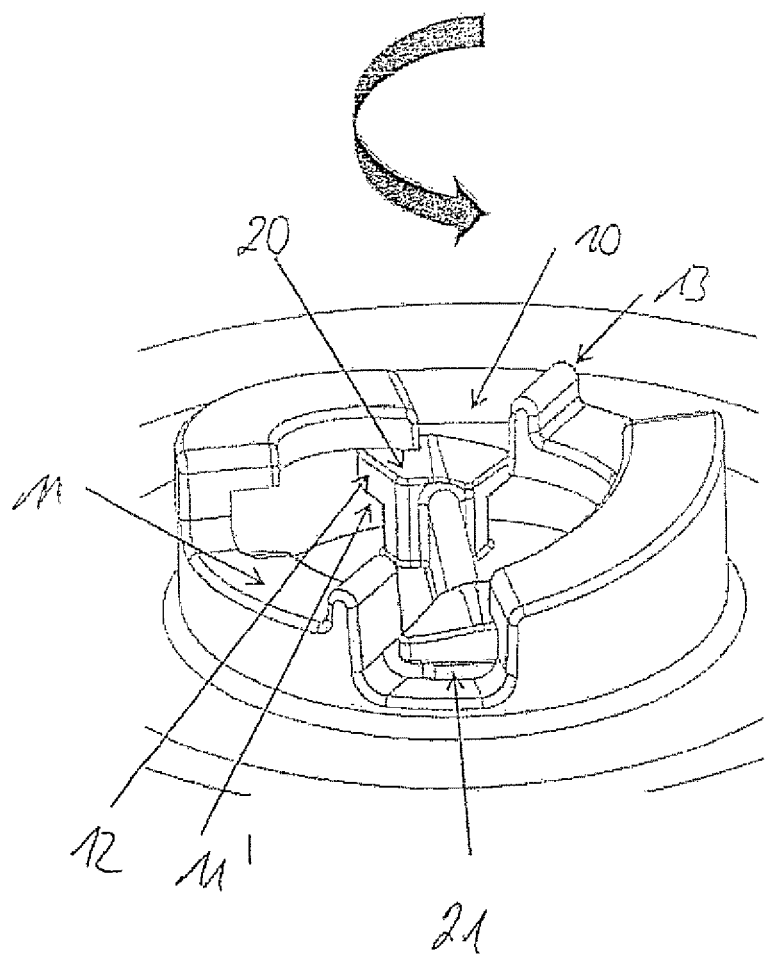
FIG. 5 is a view corresponding the FIG. 4 in the open position of the closing body.

As the oil drain plug 3 is inserted in the drain opening 2, it adopts approximately the angular position shown in FIG. 5 in relation to the drain opening 2, while the locking hooks 10 adopt a position ahead of the oblique guides 14 in relation to the circumferential direction of the drain opening 2 and in relation to a counterclockwise direction of rotation in FIG. 5. In this angular position of the oil drain plug 3 the oblique guides 14 are initially without a function.

The oil drain plug 3 is now inserted in the drain opening 2 using a combined push-turn movement whereby, in a counterclockwise movement, retaining faces 11' on the locking hooks 10 come into engagement with the guide ramps 15. A further rotary movement of the oil drain plug 3 causes the oil drain plug 3 to be raised in the axial direction until the retaining faces 11' come into engagement with the retaining faces 11 on the periphery of the drain opening 2. Finally, the stops 12 of the oil drain plug 3 come into abutment with the rotation limiting stops 13 on the periphery of the drain opening. In this position the oil drain plug 3 is in the end position.

As already mentioned at the outset, the diameter of the body 7 of the oil drain plug 3 is smaller at all points than the clear width of the drain opening 2.

Figure 6:
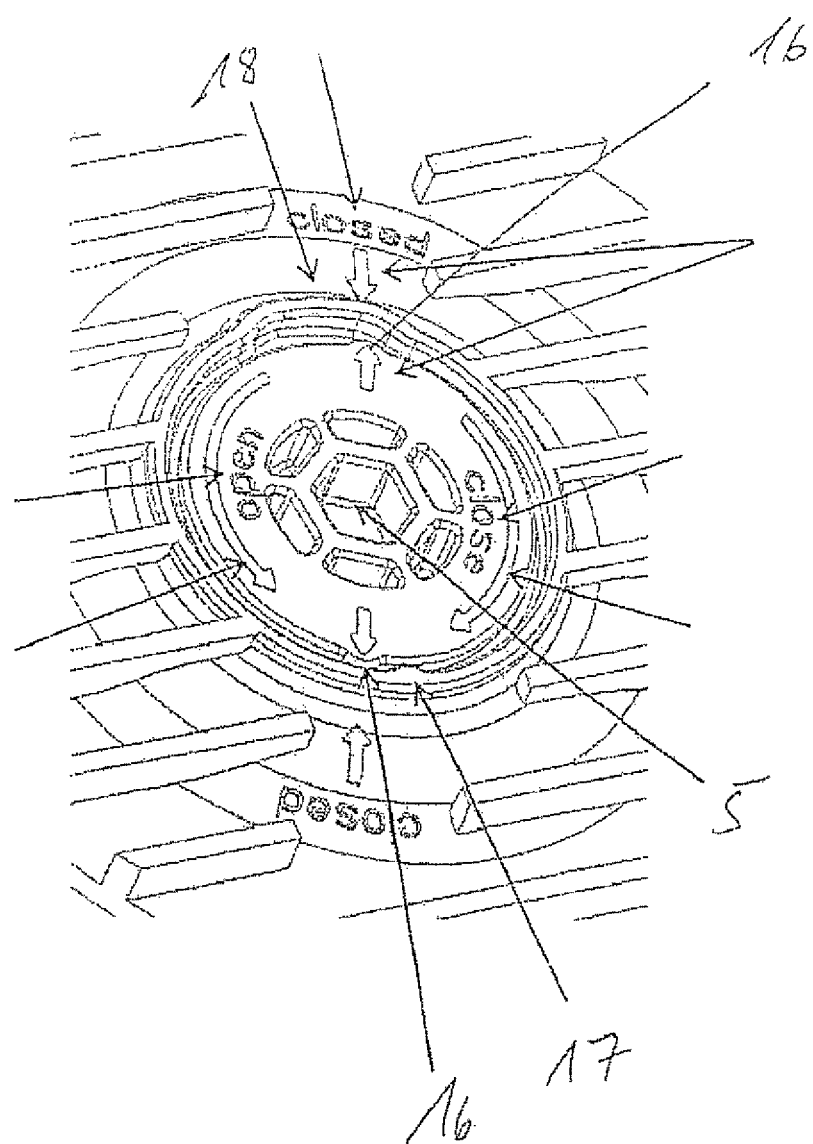
FIG. 6 is a view from below of the receptacle, in which the closing body is in the closed position.

The locking of the oil drain plug 3 is effected by means of locking cams 16 provided on diametrically opposite sides of the closing cover 6 of the oil drain plug 3, which locking cams 16, as can be seen in particular in FIG. 6, cooperate with a latching projection 17 and a recess 18 of an outwardly-projecting surround 19 of the drain opening 2.

As already mentioned above, the oil drain plug 3 is inserted in the drain opening 2 with radial play. A rotary movement of the oil drain plug 3 in the direction of the arrow marked "Close" in FIG. 6 (clockwise from the outside) causes the locking cam 16 on the periphery of the oil drain plug 3 initially to run up the latching projection 17 on the periphery of the drain opening 2. As a result of the floating mounting of the oil drain plug 3 and on account of the elasticity of the seal of the oil drain plug 3, the whole oil drain plug 3 can now execute a radial yielding movement while the diametrically opposite locking cam 16 can move into the recess 18 in the surround 19. In the end position of the oil drain plug 3, the locking cam 16 comes to be located behind the latching projection 17 in the clockwise direction while the opposite locking cam 16 rests against the end of the recess 18 on the runout side.

As can be seen especially from the illustration in FIG. 2, respective oblique slide faces 20 are provided on the sides of the locking hooks 10 oriented towards the interior of the oil pan 1, which oblique slide faces 20 come into abutment, especially as the oil drain plug 3 is twisted open/out, with the lower/outer side of the oblique guides 14, so that, viewed from the outside, a counterclockwise rotary movement at the same time causes the oil drain plug 3 to be guided axially to the open position, the amount of stagger "A" of the oblique guides being selected such that an axial movement "A" of the oil drain plug 3 to the open position is slightly greater than the strand thickness of the O-ring seal 9, so that the O-ring seal 9 moves out of engagement with the drain opening 2 of the oil pan 1 as a result of the forced axial movement when the oil drain plug 3 is twisted open.

Window-like openings in the collar surrounding the drain opening on the inside are denoted by reference 21 (cf. FIG. 5), which openings at the same time define discharge openings for the oil. The drain opening 2 is located at the lowest point of the oil pan 1.

REFERENCES

1 Oil pan
2 Drain opening
3 Oil drain plug
4 Ribbing
5 Hexagon socket
6 Closing cover
7 Body
8 Groove
9 O-ring seal
10 Locking hooks
11 Retaining faces
11' Retaining faces
12 Stops
13 Rotation limiting stops
14 Oblique guide
15 Guide ramps
16 Locking cam
17 Latching projection
18 Recess
19 Surround
20 Oblique slide faces
21 Openings

What is claimed is:

1. An oil pan for a motor vehicle, comprising:
    a drain opening located in a lower portion of the oil pan when the oil pan is in an installed position;
    a drain plug that is configured to be inserted in the drain opening and moveable from an open to a closed position and vice versa, the drain plug comprising a body comprising a circumferential groove extending around a vertical axis extending through the body; and
    an O-ring seal within the circumferential groove;
    wherein:
        the drain plug and drain opening are complementary in shape, such that in the closed position the drain plug and the drain opening form a bayonet closure, such that said O-ring seal centers the drain plug in the drain opening and engages at least an inward facing surface of the drain opening and an outward facing surface of the body to form a radial seal;
        the drain opening has a periphery including at least a retaining face, a guide ramp, and an oblique guide, the retaining face extending only over a portion of an angular extent of the drain opening at the periphery of the drain opening;
        the drain plug comprises a locking element that is configured such that, when viewed from outside the oil pan, a first rotatory movement of the drain plug causes at least a portion of the locking element to abut the guide ramp and the retaining face, so as to guide the drain plug axially to the closed position;
        the locking element comprises at least a first side that is oriented towards an interior of the oil pan, the first side comprising at least one oblique slide face that is configured to abut a facing surface of the oblique guide of the periphery of the drain opening such that a second rotatory movement of the drain plug causes the at least one oblique slide face of the locking element to abut the facing surface of the oblique guide of the periphery of the drain opening, so as to guide the drain plug axially to the open position; and
        the oblique guide of the drain opening has a stagger that is configured such that axial movement of the drain plug along the oblique guide from the closed to the open position is greater than a strand thickness of the O-ring seal and disengages the O-ring seal from the inward facing surface of the drain opening.

2. The oil pan of claim 1, wherein the drain opening has a clear width that is larger than a diameter of a part of the drain plug which passes through the drain opening, and the drain opening is over dimensioned such that the drain plug is insertable into the drain opening with radial play.

3. The oil pan of claim 1, wherein the periphery of the drain opening further comprises at least one rotation stop that defines an end position of the drain plug when the drain plug is in the closed position.

4. The oil pan of claim 1, wherein the drain plug is lockable in the closed position.

5. The oil pan of claim 1, wherein the drain plug comprises a peripheral surface including a first latching mechanism and the periphery of the drain opening comprises at least one second latching mechanism, such that the drain plug is lockable in the closed position at least in part by cooperation of the first latching mechanism and the second latching mechanism.

6. The oil pan of claim 1, wherein the locking elements are selected from the group consisting of locking hooks or locking pegs.

7. The oil pan of claim 1, wherein in said closed position, the O-ring seal is compressed transverse to said vertical axis between said inward facing surface of said drain opening and said outward facing surface of said body.

8. The oil pan of claim 1, wherein:
the oil pan comprises a wall;
the drain opening extends through the wall and comprises a first latching projection and a second latching projection;
the body of said drain plug comprises a peripheral surface;
said body further comprises a first locking cam extending from said peripheral surface and a second locking cam extending from said peripheral surface; and
said first rotatory movement causes the first and second locking cam to move up the first latching projection and the second latching projection, respectively, such that the first locking cam is located behind the first latching projection and the second locking cam is located behind the second latching projection when said drain plug is in the closed position.

9. The oil pan of claim 1, wherein said circumferential groove is u-shaped.

10. The oil pan of claim 1, wherein:
the retaining face of the drain opening is oriented towards the interior of the oil pan;
the guide ramp comprises a guide ramp surface oriented towards the interior of the oil; pan;
the facing surface of the oblique guide is oriented towards the exterior of the oil pan;
the locking element is configured such that said first rotatory movement of the drain plug causes the at least one oblique slide face to abut and be guided along the facing surface of the oblique guide towards the guide ramp and the retaining face, and causes at least a portion of the locking element oriented towards an exterior of the oil pan to abut the guide ramp and the retaining face, so as to bring the drain plug axially to the closed position; and
the locking element is configured such that said second rotatory movement causes the at least one oblique slide face to abut and be guided along the facing surface of the oblique guide so as to disengages the locking element from the guide ramp and the retaining face and bring the drain plug axially to the open position.

* * * * *